(12) United States Patent  (10) Patent No.: US 12,127,039 B2
Guo et al.  (45) Date of Patent: Oct. 22, 2024

(54) METHOD FOR REPORTING UDC INFORMATION BY UE, AND DEVICE

(71) Applicant: Huawei Technologies Co., Ltd., Shenzhen (CN)

(72) Inventors: Ao Guo, Shanghai (CN); Chuting Yao, Beijing (CN); Jianhua Yang, Shanghai (CN); Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 441 days.

(21) Appl. No.: 17/634,622

(22) PCT Filed: Aug. 10, 2020

(86) PCT No.: PCT/CN2020/108269
§ 371 (c)(1),
(2) Date: Feb. 11, 2022

(87) PCT Pub. No.: WO2021/027786
PCT Pub. Date: Feb. 18, 2021

(65) Prior Publication Data
US 2022/0330086 A1  Oct. 13, 2022

(30) Foreign Application Priority Data
Aug. 14, 2019 (CN) .............................. 201910750029

(51) Int. Cl.
*H04W 28/06* (2009.01)
*H04W 8/24* (2009.01)
(52) U.S. Cl.
CPC ............. *H04W 28/06* (2013.01); *H04W 8/24* (2013.01)

(58) Field of Classification Search
CPC ....... H04W 28/06; H04W 8/24; H04W 88/02; H04W 24/10; H04W 28/065; H04L 49/90;
(Continued)

(56) References Cited

U.S. PATENT DOCUMENTS 10,341,466 B2 * 7/2019 Raina .................. H04L 69/24
10,638,353 B2 * 4/2020 Ahmadzadeh ...... H04W 28/065
(Continued)

FOREIGN PATENT DOCUMENTS

CN  102300256 A  12/2011
CN  102413506 A  4/2012
(Continued)

OTHER PUBLICATIONS

Huawei et al., "Discussion on set up and release of UDC", 3GPP TSG-RAN WG2 Meeting #101, R2-1802855, Feb. 26-Mar. 2, 2018, 8 Pages, Athens, Greece (Year: 2018).*
(Continued)

*Primary Examiner* — Brian T O Connor
(74) *Attorney, Agent, or Firm* — Slater Matsil, LLP

(57) ABSTRACT

This application relates to a method for reporting UDC information by UE, and a device. The method includes: A terminal device receives request information sent by a network device, where the request information is used to request the terminal device to report first information; and the terminal device sends the first information to the network device, where the first information is used to indicate that the terminal device supports a UDC capability, and indicate a maximum quantity of DRBs that can be simultaneously supported by the terminal device and for which UDC is activated.

20 Claims, 7 Drawing Sheets

(58) Field of Classification Search
CPC ..... H04L 1/1642; H04L 1/1835; H04L 69/04; H04L 69/24; H04L 69/06
See application file for complete search history.

(56) References Cited

U.S. PATENT DOCUMENTS

| | | | | |
|---|---|---|---|---|
| 10,805,430 | B2* | 10/2020 | Raina | H04W 28/0289 |
| 11,212,045 | B2* | 12/2021 | Liu | H04J 3/06 |
| 11,246,059 | B2* | 2/2022 | Shreevastav | H04W 28/06 |
| 11,265,760 | B2* | 3/2022 | Quan | H04W 28/06 |
| 11,665,766 | B2* | 5/2023 | Kim | H04W 80/02 370/329 |
| 11,800,597 | B2* | 10/2023 | Kim | H04W 80/08 |
| 11,856,452 | B2* | 12/2023 | Kim | H04W 28/06 |
| 11,985,538 | B2* | 5/2024 | Jin | H04L 67/12 |
| 2017/0054461 | A1 | 2/2017 | Kovac | |
| 2020/0204986 | A1* | 6/2020 | Liu | H04L 69/22 |
| 2022/0070729 | A1* | 3/2022 | Sato | H04L 69/22 |
| 2024/0098547 | A1* | 3/2024 | Kim | H04W 36/08 |
| 2024/0129795 | A1* | 4/2024 | Kim | H04W 12/106 |

FOREIGN PATENT DOCUMENTS

| | | |
|---|---|---|
| CN | 105580340 A | 5/2016 |
| CN | 107113291 A | 8/2017 |
| CN | 108200091 A | 6/2018 |
| CN | 109802922 A | 5/2019 |
| CN | 109842653 A | 6/2019 |
| CN | 109842905 A | 6/2019 |
| TW | 201922022 A | 6/2019 |
| WO | 2014109989 A2 | 7/2014 |
| WO | 2016077730 A1 | 5/2016 |
| WO | 2019093835 A1 | 5/2019 |
| WO | 2019135649 A1 | 7/2019 |

OTHER PUBLICATIONS

MediaTek Inc., "Discussion on UDC Reconfiguration", 3GPP TSG-RAN WG2 Meeting #101, R2-1802130, Feb. 26-Mar. 2, 2018, 4 Pages, Athens, Greece (Year: 2018).*

Peiyang, J., "Research on the Integration of 5G and WiFi Technology", China Computer & Communication, Jul. 15, 2019, 2 Pages.

Mediatek Inc., "Discussion on UDC Configurations", 3GPP TSG-RAN WG2 #99bis, R2-1710990, Oct. 9-13, 2017, 2 Pages, Prague, Czech Republic.

Huawei et al., "Discussion on UE capabilities of UDC", 3GPP TSG-RAN WG2 Meeting #101, R2-1802858, Feb. 26-Mar. 2, 2018, 4 Pages, Athens, Greece.

CATT., "Summary for WI UL data compression in LTE", 3GPP TSG RAN Meeting #79, RP-180231, Mar. 19-22, 2018, 2 Pages, Chennai, India.

* cited by examiner

Before compression

METHOD FOR REPORTING UDC INFORMATION BY UE, AND DEVICE

CROSS-REFERENCE TO RELATED APPLICATIONS

This application is a national stage of International Application No. PCT/CN2020/108269, filed on Aug. 10, 2020, which claims priority to Chinese Patent Application No. 201910750029.4, filed on Aug. 14, 2019. Both of the aforementioned applications are hereby incorporated by reference in their entireties.

TECHNICAL FIELD

This application relates to the field of communications technologies, and in particular, to a method for reporting UDC information by UE, and a device.

BACKGROUND

Long term evolution (long term evolution, LTE) introduces an uplink data compression (UDC, uplink data compression) technology in the R15 protocol. The core idea of this technology is to reduce an amount of transmitted data by compressing data packets sent in uplink, to increase a rate, enhance coverage, and reduce a latency. Specifically, in the UDC technology, a transmit end may remove duplicate content between adjacent original data packets through compression by using a correlation between the adjacent original data packets, but transmit only different parts. After receiving the different parts, a receive end can obtain the original data packets through decompression by adding the duplicate content.

In an existing UDC mechanism, UE can report only whether the UE supports a UDC capability, but cannot report information about UDC. Therefore, a base station cannot perform configuration based on an actual UDC capability of the UE.

SUMMARY

Embodiments of this application provide a method for reporting UDC information by UE, and a device, to improve data transmission efficiency.

According to a first aspect, a first communication method is provided. The method includes: A terminal device sends first information to a network device, where the first information is used to indicate that the terminal device supports a UDC capability; the terminal device receives DRB configuration information sent by the network device, where the DRB configuration information includes at least configuration information of a first DRB; the terminal device determines a UDC parameter of the first DRB based on the configuration information of the first DRB; and the terminal device sends the UDC parameter to the network device.

Alternatively, the method may be performed by a communications device, or a communications apparatus, for example, a chip system, that can support the communications device in implementing the functions described in the method. For example, the communications device is a terminal device.

In the embodiments of this application, the terminal device may determine, based on a condition of data carried by a DRB, a UDC parameter that is most appropriate to the DRB, so as to improve compression efficiency of a data service carried by the DRB.

With reference to the first aspect, in a first possible implementation of the first aspect, the first information is further used to indicate a maximum quantity of DRBs that can be simultaneously supported by the terminal device and for which UDC is activated. Alternatively, the method further includes: The terminal device sends second information to the network device, where the second information is used to indicate a maximum quantity of DRBs that can be simultaneously supported by the terminal device and for which UDC is activated.

In the embodiments of this application, the terminal device may report, through the first information, the maximum quantity of DRBs that can be simultaneously supported and for which UDC is activated, so that the base station may ensure, based on a capability of the terminal device, that UDC can be simultaneously activated for as many DRBs as possible, so as to improve a communication speed of the terminal device and further improve user experience.

With reference to the first aspect and the first possible implementation of the first aspect, in a second possible implementation of the first aspect, the terminal device receives UDC activation information sent by the network device, where the UDC activation information is used to indicate a DRB for which UDC is activated.

With reference to the first aspect and the first possible implementation of the first aspect, in a third possible implementation of the first aspect, the UDC parameter includes one or any combination of the following: a dictionary type, a dictionary length, a buffer size, a compression algorithm, and a UDC priority.

With reference to the first aspect and the first possible implementation of the first aspect, in a fourth possible implementation of the first aspect, that a terminal device sends first information to a network device includes: The terminal device sends the first information to the network device through capability information of the terminal device.

With reference to the first aspect and the first possible implementation of the first aspect, in a fifth possible implementation of the first aspect, that the terminal device determines a UDC parameter of the first DRB based on the configuration information of the first DRB includes: The terminal device determines a type of a data service carried by the first DRB; and the terminal device determines the UDC parameter based on the type of the data service, where the UDC parameter includes a dictionary type.

With reference to the first aspect and the first possible implementation of the first aspect, in the fifth possible implementation of the first aspect, the DRB configuration information is received through RRC signaling.

With reference to the first aspect and the first possible implementation of the first aspect, in the fifth possible implementation of the first aspect, that the terminal device sends the UDC parameter to the network device includes: The terminal device assembles the UDC parameter into a control PDU or a MAC CE; and the terminal device adds an identifier to the control PDU or the MAC CE, where the identifier is used to indicate that the control PDU or the MAC CE includes the UDC parameter.

According to a second aspect, a second communication method is provided. The method includes: A network device receives first information sent by a terminal device, where the first information is used to indicate that the terminal device supports a UDC capability; the network device sends DRB configuration information to the terminal device, where the DRB configuration information includes at least configuration information of a first DRB; and the network device receives a UDC parameter sent by the terminal device, where the UDC parameter is determined by the terminal device based on the configuration information of the first DRB.

With reference to the second aspect, in a first possible implementation of the second aspect, the first information is further used to indicate a maximum quantity of DRBs that can be simultaneously supported by the terminal device and for which UDC is activated. Alternatively, the method further includes: The network device receives second information sent by the terminal device, where the second information is used to indicate a maximum quantity of DRBs that can be simultaneously supported by the terminal device and for which UDC is activated.

With reference to the second aspect and the first possible implementation of the second aspect, in a second possible implementation of the second aspect, the network device sends UDC activation information to the terminal device, where the UDC activation information is used to indicate a DRB for which UDC is activated.

With reference to the second aspect and the first possible implementation of the second aspect, in a third possible implementation of the second aspect, the UDC parameter includes one or any combination of the following: a dictionary type, a dictionary length, a buffer size, a compression algorithm, and a UDC priority.

With reference to the second aspect and the first possible implementation of the second aspect, in a fourth possible implementation of the second aspect, that a network device receives first information sent by a terminal device includes: The network device receives, through capability information of the terminal device, the first information sent by the terminal device.

With reference to the second aspect and the first possible implementation of the second aspect, in a fifth possible implementation of the second aspect, the DRB configuration information is sent through RRC information.

With reference to the second aspect and the first possible implementation of the second aspect, in a sixth possible implementation of the second aspect, the UDC parameter is determined by the terminal device based on a type of a data service carried by the first DRB, and the UDC parameter includes a dictionary type.

With reference to the second aspect and the first possible implementation of the second aspect, in a seventh possible implementation of the second aspect, that the network device receives a UDC parameter sent by the terminal device includes: The network device receives a control PDU or a MAC CE that carries an identifier, where the identifier is used to indicate that the control PDU or the MAC CE includes the UDC parameter; and the network device obtains the UDC parameter from the control PDU or the MAC CE.

According to a third aspect, a communications module is provided. For example, the communications module is the communications device described above, and the communications apparatus is configured to perform the method according to any one of the first aspect or the possible implementations of the first aspect. Specifically, the communications apparatus may include modules configured to perform the method according to any one of the first aspect or the possible implementations of the first aspect. For example, the communications apparatus includes a processing module and a transceiver module. For example, the communications apparatus is a terminal device. The transceiver module is configured to send first information to a network device, and the first information is used to indicate that the terminal device supports a UDC capability. The transceiver module is further configured to receive DRB configuration information sent by the network device, and the configuration information includes at least configuration information of a first DRB. The processing module is configured to determine a UDC parameter of the first DRB based on the configuration information of the first DRB. The transceiver module is further configured to send the UDC parameter to the network device.

With reference to the third aspect, in a first possible implementation of the third aspect, the first information is further used to indicate a maximum quantity of DRBs that can be simultaneously supported by the terminal device and for which UDC is activated. Alternatively, the transceiver module is further configured to send second information to the network device, and the second information is used to indicate a maximum quantity of DRBs that can be simultaneously supported by the terminal device and for which UDC is activated.

With reference to the third aspect and the first possible implementation of the third aspect, in a second possible implementation of the third aspect, the transceiver module is further configured to receive UDC activation information sent by the network device, and the UDC activation information is used to indicate a DRB for which UDC is activated.

With reference to the third aspect and the first possible implementation of the third aspect, in a third possible implementation of the third aspect, the UDC parameter includes one or any combination of the following: a dictionary type, a dictionary length, a buffer size, a compression algorithm, and a UDC priority.

With reference to the third aspect and the first possible implementation of the third aspect, in a fourth possible implementation of the third aspect, the sending first information to a network device includes: sending the first information to the network device through capability information of the communications apparatus.

With reference to the third aspect and the first possible implementation of the third aspect, in a fifth possible implementation of the third aspect, the determining a UDC parameter of the first DRB based on the configuration information of the first DRB includes: determining a type of a data service carried by the first DRB; and determining the UDC parameter based on the type of the data service, where the UDC parameter includes a dictionary type.

With reference to the third aspect and the first possible implementation of the third aspect, in a sixth possible implementation of the third aspect, the DRB configuration information is received through RRC signaling.

With reference to the third aspect and the first possible implementation of the third aspect, in a seventh possible implementation of the third aspect, the sending the UDC parameter to the network device includes: assembling the UDC parameter into a control PDU or a MAC CE; and adding an identifier to the control PDU or the MAC CE, where the identifier is used to indicate that the control PDU or the MAC CE includes the UDC parameter.

According to a fourth aspect, a communications module is provided. For example, the communications module is the communications device described above, and the communications apparatus is configured to perform the method according to any one of the second aspect or the possible implementations of the second aspect. Specifically, the communications apparatus may include modules configured to perform the method according to any one of the second aspect or the possible implementations of the second aspect.

For example, the communications apparatus includes a processing module and a transceiver module. For example, the communications apparatus is a network device.

The transceiver module is configured to receive first information sent by a terminal device, and the first information is used to indicate that the terminal device supports a UDC capability.

The transceiver module is further configured to send DRB configuration information to the terminal device, and the DRB configuration information includes at least configuration information of a first DRB.

The transceiver module is further configured to receive a UDC parameter sent by the terminal device, and the UDC parameter is determined by the terminal device based on the configuration information of the first DRB.

With reference to the fourth aspect, in a first possible implementation of the fourth aspect, the first information is further used to indicate a maximum quantity of DRBs that can be simultaneously supported by the terminal device and for which UDC is activated.

Alternatively, the receiving module is further configured to receive second information sent by the terminal device, and the second information is used to indicate a maximum quantity of DRBs that can be simultaneously supported by the terminal device and for which UDC is activated.

With reference to the fourth aspect and the first possible implementation of the fourth aspect, in a second possible implementation of the fourth aspect, the processing module is configured to determine a DRB for which UDC is activated.

The transceiver module is further configured to send UDC activation information to the terminal device, and the UDC activation information is used to indicate the DRB for which UDC is activated.

With reference to the fourth aspect and the first possible implementation of the fourth aspect, in a third possible implementation of the fourth aspect, the UDC parameter includes one or any combination of the following: a dictionary type, a dictionary length, and a UDC priority.

With reference to the fourth aspect and the first possible implementation of the fourth aspect, in a fourth possible implementation of the fourth aspect, the receiving first information sent by a terminal device includes: receiving, through capability information of the terminal device, the first information sent by the terminal device.

With reference to the fourth aspect and the first possible implementation of the fourth aspect, in a fifth possible implementation of the fourth aspect, the DRB configuration information is sent through RRC information.

With reference to the fourth aspect and the first possible implementation of the fourth aspect, in a sixth possible implementation of the fourth aspect, the UDC parameter is determined by the terminal device based on a type of a data service carried by the first DRB, and the UDC parameter includes a dictionary type.

With reference to the fourth aspect and the first possible implementation of the fourth aspect, in a seventh possible implementation of the fourth aspect, the receiving a UDC parameter sent by the terminal device includes: receiving a control PDU or a MAC CE that carries an identifier, where the identifier is used to indicate that the control PDU or the MAC CE includes the UDC parameter; and obtaining the UDC parameter from the control PDU or the MAC CE.

According to a fifth aspect, a computer storage medium is provided. The computer readable storage medium stores instructions, and when the instructions are run on a computer, the computer is enabled to perform the method according to any one of the first aspect or the possible designs of the first aspect.

According to a sixth aspect, a computer storage medium is provided. The computer readable storage medium stores instructions, and when the instructions are run on a computer, the computer is enabled to perform the method according to any one of the second aspect or the possible designs of the second aspect.

According to a seventh aspect, a computer program product including instructions is provided. The computer program product stores the instructions, and when the computer program product runs on a computer, the computer is enabled to perform the method according to any one of the first aspect or the possible designs of the first aspect.

According to an eighth aspect, a computer program product including instructions is provided. The computer program product stores the instructions, and when the computer program product runs on a computer, the computer is enabled to perform the method according to any one of the second aspect or the possible designs of the second aspect.

According to a ninth aspect, a communications device is provided. The communications device includes a processor and a transceiver, and the processor and the transceiver are coupled to each other and are configured to perform the method according to any one of the first aspect or the possible designs of the first aspect.

According to a tenth aspect, a communications device is provided. The communications device includes a processor and a transceiver, and the processor and the transceiver are coupled to each other and are configured to perform the method according to any one of the second aspect or the possible designs of the second aspect.

According to an eleventh aspect, a chip system is provided. The chip system includes:
   a memory, configured to store instructions; and
   a processor, configured to invoke the instructions from the memory and run the instructions, to enable a communications device on which the chip system is installed to perform the method according to any one of the first aspect or the possible designs of the first aspect.

According to a twelfth aspect, a chip system is provided. The chip system includes:
   a memory, configured to store instructions; and
   a processor, configured to invoke the instructions from the memory and run the instructions, to enable a communications device on which the chip system is installed to perform the method according to any one of the second aspect or the possible designs of the second aspect.

According to a thirteenth aspect, a communications apparatus is provided. The communications apparatus includes:
   a memory, configured to store instructions; and
   a processor, configured to invoke the instructions from the memory and run the instructions, to enable a communications device on which the communications apparatus is installed to perform the method according to any one of the first aspect or the possible designs of the first aspect.

According to a fourteenth aspect, a communications apparatus is provided. The communications apparatus includes:
   a memory, configured to store instructions; and
   a processor, configured to invoke the instructions from the memory and run the instructions, to enable a communications device on which the communications apparatus is installed to perform the method according to any one of the second aspect or the possible designs of the second aspect.

DETAILED DESCRIPTION OF ILLUSTRATIVE EMBODIMENTS

Figure 1:
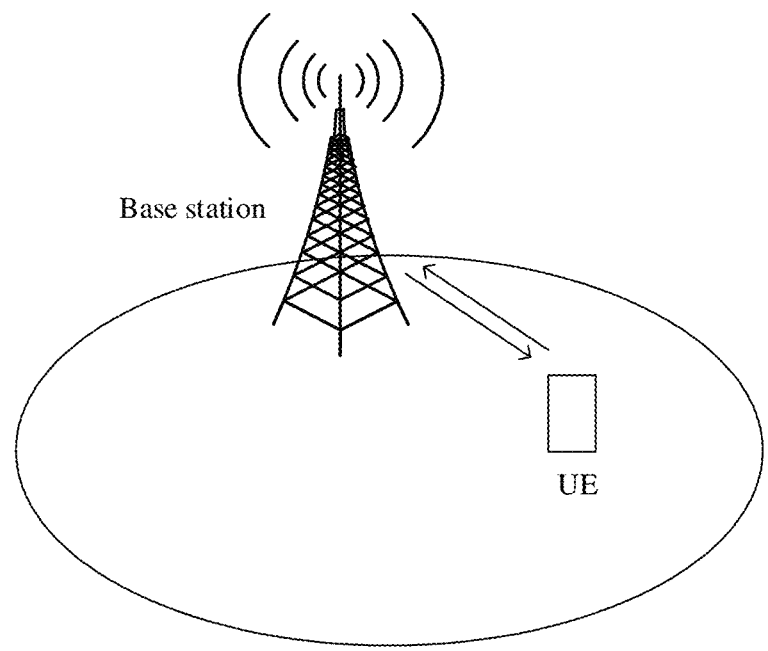
FIG. 1 is a schematic diagram of an application scenario according to an embodiment of this application.

To make the objectives, technical solutions, and advantages of embodiments of this application clearer, the following further describes the embodiments of this application in detail with reference to the accompanying drawings.

The following describes some terms in the embodiments of this application, to help a person skilled in the art have a better understanding.

A terminal device includes a device that provides a user with voice and/or data connectivity, for example, may include a handheld device with a wireless connection function, or a processing device connected to a wireless modem. In the embodiments of this application, the terminal device may also be referred to as user equipment (user equipment, UE). The terminal device may communicate with a core network through a radio access network (radio access network, RAN), and exchange voice and/or data with the RAN. The terminal device may include a wireless terminal device, a mobile terminal device, a device-to-device (device-to-device, D2D) terminal device, a vehicle-to-everything (vehicle-to-everything, V2X) terminal device, a machine-to-machine/machine-type communications (machine-to-machine/machine-type communications, M2M/MTC) terminal device, an Internet of things (Internet of things, IoT) terminal device, a subscriber unit (subscriber unit), a subscriber station (subscriber station), a mobile station (mobile station), a remote station (remote station), an access point (access point, AP), a remote terminal (remote termi-nal), an access terminal (access terminal), a user terminal (user terminal), a user agent (user agent), a user device (user device), or the like. For example, the terminal device may include a mobile phone (or referred to as a "cellular" phone), a computer with a mobile terminal device, or a portable, pocket-sized, handheld, or computer built-in mobile apparatus. For example, the terminal device may be a device such as a personal communications service (personal communication service, PCS) phone, a cordless telephone set, a session initiation protocol (session initiation protocol, SIP) phone, a wireless local loop (wireless local loop, WLL) station, or a personal digital assistant (personal digital assistant, PDA). The terminal device alternatively includes a limited device, for example, a device with relatively low power consumption, a device with a limited storage capability, or a device with a limited computing capability. For example, the terminal device includes an information sensing device such as a barcode, a radio frequency identification (radio frequency identification, RFID) device, a sensor, a global positioning system (global positioning system, GPS), or a laser scanner.

By way of example but not limitation, in the embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that is directly worn on a body or integrated into clothes or an accessory of a user. The wearable device is more than a hardware device, but implements a powerful function through software support, data exchange, and cloud interaction. In a broad sense, the wearable intelligent device includes full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs.

If the various terminal devices described above are located in a vehicle (for example, placed in the vehicle or mounted in the vehicle), the terminal devices may be considered as in-vehicle terminal devices. For example, the in-vehicle terminal devices are also referred to as on-board units (on-board unit, OBU).

A network device includes, for example, an access network (access network, AN) device or a core network device such as a base station (for example, an access point), and may be a device that communicates with a wireless terminal device over an air interface through one or more cells in an access network. Alternatively, for example, a network device in a V2X technology is a road side unit (road side unit, RSU). The base station may be configured to mutually convert a received over-the-air frame and an Internet protocol (IP) packet and serve as a router between the terminal device and a rest part of the access network, where the rest part of the access network may include an IP network. The RSU may be a fixed infrastructure entity that supports a vehicle-to-everything (vehicle-to-everything, V2X) application, and may exchange a message with another entity that supports the V2X application. The access network device may further coordinate attribute management of an air interface. For example, the access network device may include an evolved NodeB (NodeB, eNB, or e-NodeB, evolutional Node B) in an LTE system or a long term evolution-advanced (long term evolution-advanced, LTE-A) system; or may include a next-generation NodeB (next generation node B, gNB) in a 5G new radio (new radio, NR) system; or may include a centralized unit (centralized unit, CU) and a distributed unit (distributed unit, DU) in a cloud radio access network (cloud radio access network, Cloud RAN) system. This is not limited in the embodiments of this application.

"At least one" means one or more, and "a plurality of" means two or more. The term "and/or" describes an association relationship between associated objects and indicates that three relationships may exist. For example, A and/or B may indicate the following cases: Only A exists, both A and B exist, and only B exists, where A and B may be singular or plural. The character "/" usually indicates an "or" relationship between the associated objects. "At least one of the following items (pieces)" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

In addition, unless otherwise stated, ordinal numbers such as "first" and "second" in the embodiments of this application are used to distinguish between a plurality of objects, but are not intended to limit an order, a time sequence, priorities, or importance of the plurality of objects. For example, first information and second information are merely intended to distinguish between different signaling, but do not indicate that the two types of information are different in content, priorities, sending sequences, importance, or the like.

The foregoing describes some concepts in the embodiments of this application. The following describes technical features in the embodiments of this application.

FIG. 1 is a schematic diagram of a network architecture according to an embodiment of this application. The network architecture includes a base station and one piece of UE. In the network architecture, the base station and the UE may communicate with each other.

Currently, in a UDC technology of an LTE system, the UE, serving as a data transmit end, needs to compress to-be-sent data, and then sends compressed data to the base station. After receiving the compressed data, the base station may decompress the compressed data to obtain the complete data.

Specifically, because adjacent data packets in data packets transmitted by the UE to the base station are usually associated, the adjacent data packets are likely to have duplicate content. According to this feature, in the UDC technology, both data compression performed by the UE and data decompression performed by the base station depend on a buffer (buffer), and the buffer stores data. The buffer and the data in the buffer may also be referred to as a dictionary (dictionary). Alternatively, the dictionary may refer to the data in the buffer. This is not limited in the embodiments of this application. The UE and the base station store and maintain a common dictionary, that is, the UE and the base station use dictionaries with same content. The content of the dictionary is a data packet transmitted last time or preset initial content. When compressing a to-be-transmitted data packet, the UE searches for duplicate content of the data packet in the dictionary. If there is duplicate content, the duplicate content is removed from the data packet to form a compressed data packet. After the compression is completed, the UE sends the compressed data packet and indication information of the duplicate content to the base station. After receiving the compressed data packet and the indication information, the base station finds the duplicate content in the dictionary, and then adds the duplicate content to the compressed data packet, so as to obtain the complete data packet. Simply put, the idea is to replace a duplicate part of data with shorter data. In other words, the content of the dictionary or the buffer may be changed at any time with compression. It may be understood that, in the embodiments of this application, for ease of description, the dictionary and the buffer may substitute for each other.

Figure 2A:
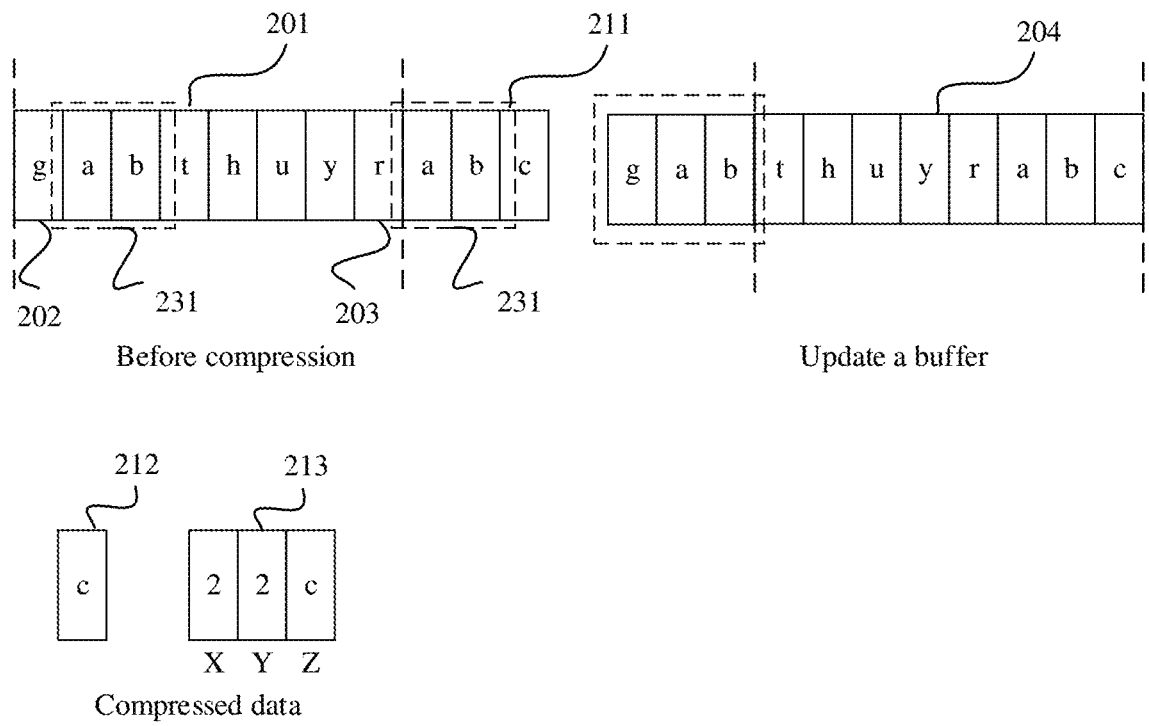
FIG. 2A is a schematic diagram of a UDC technology according to an embodiment of this application.

FIG. 2A is a schematic diagram of a UDC technology. As shown in FIG. 2A, a buffer 201 includes space of 8 bytes, and stores "gabthuyr". A byte 202 is the first byte in the buffer 201, and a byte 203 is the last byte in the buffer 201. In this case, both UE and a base station store the buffer 201, and content stored in the buffer 201 is consistent. A data packet 211 is a data packet to be transmitted by the UE to the base station. Before compression, content of the data packet 211 is "abc". When compressing the data packet 211, the UE searches the buffer 201 for content that is duplicate with the content of the data packet 211. In some embodiments, a Deflate algorithm may be used to search for duplicate content existing in the buffer and the to-be-transmitted data packet. The Deflate algorithm is a common compression algorithm, and includes both Huffman coding and an LZ77 algorithm. It should be noted that the embodiments of this application may alternatively be implemented by using another compression algorithm.

As shown in FIG. 2A, before compression, the data packet 211 and the buffer 201 have duplicate content 231, where the duplicate content 231 is "ab". When the UE finds that "ab" of the data packet 231 is duplicate with content of the buffer 201, the UE removes "ab" from the data packet 231 to form a compressed data packet 212, where content of the compressed data packet 212 is "c". In addition, the duplicate content may be indicated in a form of a triplet 213. The triplet may also be referred to as a compressed code. This is not limited in the embodiments of this application. As shown in FIG. 2A, the triplet 213 in the compressed data includes three types of data. For example, X, Y, and Z may be used to represent the three types of data, where X is used to record a start position of the duplicate content in the buffer, Y is used to record a length of the duplicate content, and Z is used to record a character after the duplicate content in the to-be-compressed data packet. For example, as shown in FIG. 2A, counting from front to back, the start position of the duplicate content 231 in the buffer 201 is the second byte, and therefore X is 2. The length of the duplicate content 231 is 2 bytes, and therefore Y is 2. The character after the duplicate content 231 in the data packet 211 is c, and therefore z is c. It should be noted that the data format of the triplet is merely an example. For example, positions of X, Y, and Z may be arranged in any order, and the start position may alternatively be counted from back to front. For example, in FIG. 2A, Y may alternatively be 7. In some other embodiments, when the UE finds no duplicate content, 0 or 1 may be simply used to indicate that the data packet is not compressed. Compressed data is not specifically limited in the embodiments of this application.

Figure 2B:
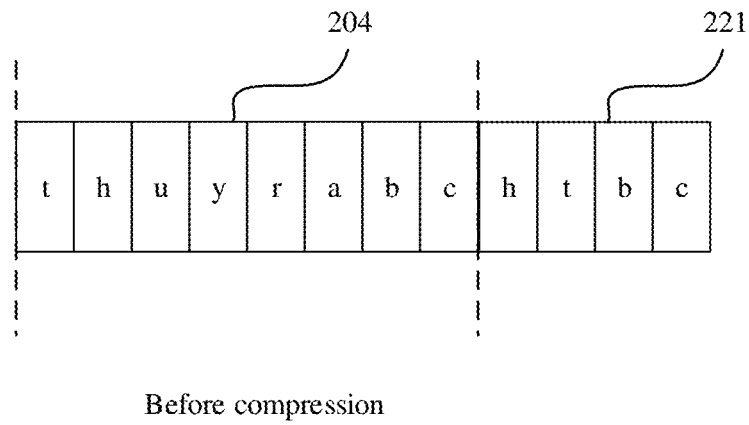
FIG. 2B is a schematic diagram of another UDC technology according to an embodiment of this application.

After compressing the data packet 211 based on the content stored in the buffer 201, the UE obtains the compressed data packet 212 and the triplet 213. The UE may then transmit the compressed data packet 212 and the triplet 213 to the base station. In addition, the UE needs to update the buffer 201. In some embodiments, the UE may add content of the data packet 211 to the buffer 201 from back to front. Storage space of the buffer 201 is limited. Therefore, if a sum of newly stored data and originally stored data in the buffer is greater than the storage space of the buffer, an excess part is deleted. For example, as shown in FIG. 2A, when content "abc" of the data packet 211 is stored in the buffer 201 from back to front, data "gab" of the first three bytes in the buffer 201 is deleted before compression. Content stored in an updated buffer 204 is "thuyrabc". When the UE needs to transmit a next data packet, the UE may compress the next data packet based on the updated buffer 204. For example, as shown in FIG. 2B, content of a next data packet 221 that needs to be transmitted by the UE is "htbc", and the content stored in the buffer 204 is "thuyrabc". The UE compresses the data packet 221 based on the content of the buffer 204. For a specific compression process, refer to FIG. 2A.

After receiving the compressed data packet 212 and the triplet 213, the base station may decompress the data packet 212 based on data stored in the buffer 201, to obtain the data packet 211. Similar to the UE updating the buffer, after the base station obtains the data packet 211, the base station may store the data packet 211 into the buffer 201, to obtain the updated buffer 204. In this way, content of respective buffers of the base station and the UE is consistent.

In an LTE system, service flows that have same quality of service (quality of service, QoS) treatment between one piece of UE and one gateway are referred to as an evolved packet system (evolved packet system, EPS) bearer. In the EPS bearer, a section between the UE and an air interface of an evolved NodeB (evolved node B, eNodeB) is referred to as a radio bearer. Radio bearers may be classified into a signaling radio bearer (signaling radio bearer, SRB) and a data radio bearer (data radio bearer, DRB) based on different content of the bearers. The SRB carries signaling data, and the DRB carries user plane data. When the UE needs to enable a data service, the UE needs to request a base station to establish a DRB, and then the base station configures a DRB for the UE. For example, when a user starts to use iQIYI, the UE and the base station establish a DRB 1 to carry iQIYI data. After a period of time, the user starts to use WeChat, and the UE and the base station establish a new DRB 2 to carry WeChat data. The UE and the base station release the DRB 1 if the user stops running of iQIYI.

Figure 3:
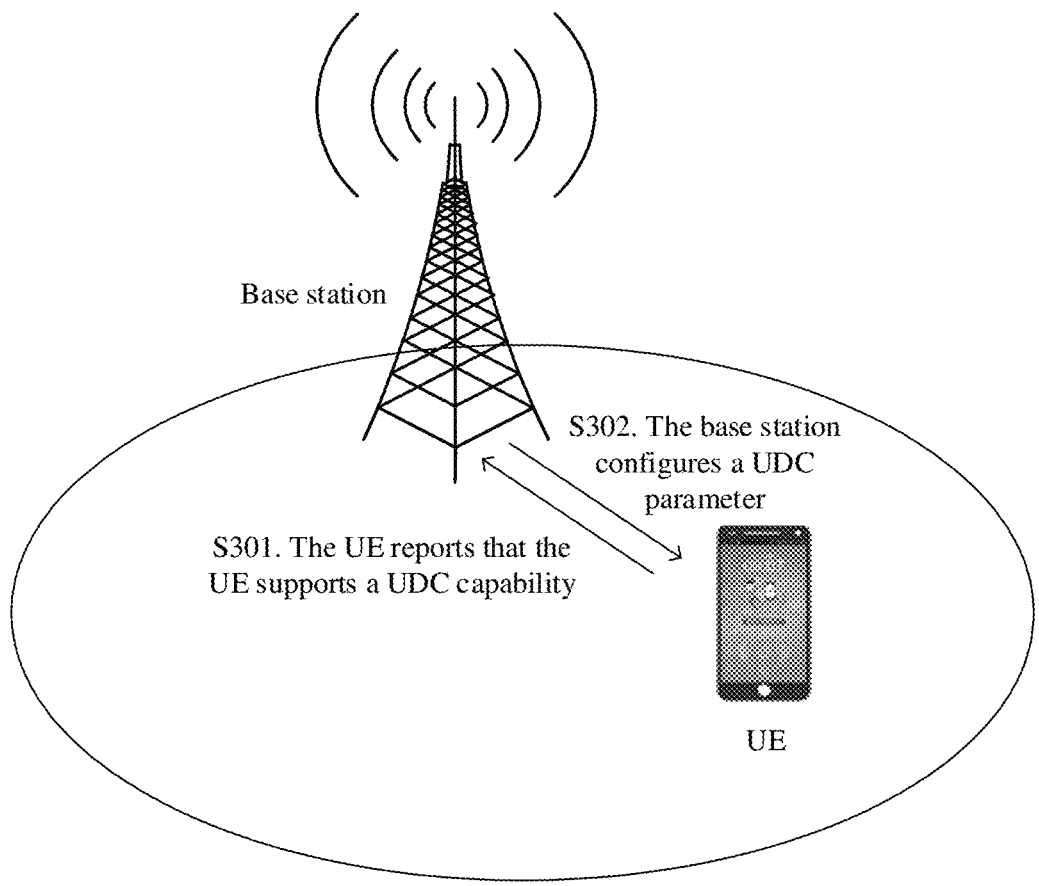
FIG. 3 is a schematic diagram of reporting a UDC capability in the conventional technology.

As shown in FIG. 3, in an existing LTE system, if use of UDC is expected, there are following two steps.

S301. UE reports UDC capability information.

If the UE wants to use UDC, in a process of accessing a base station, the UE may report the UDC capability information to the base station. The UDC capability information is used to indicate that the UE supports UDC and to request the base station to configure a UDC parameter. In some embodiments, the UE may report UDC through UE capability information.

S302. The base station configures a UDC parameter.

After receiving the UDC capability information sent by the UE, the base station configures some UDC parameters for the UE, and sends the UDC parameters to the UE to activate UDC. The UDC parameter may include a dictionary type, a dictionary length, or the like. In the conventional technology, the base station determines specific DRBs for which UDC is to be activated, and configures a UDC parameter for each DRB. Generally, a data service carried by a DRB is related to a terminal application. For example, when a user sends a message through WeChat, a DRB is required to carry data. If the user uses iQIYI to watch a video at the same time, another DRB is required to carry data.

In some embodiments, dictionary types include a standard dictionary, a default dictionary, and an operator-customized dictionary. The standard dictionary is a dictionary specified by a standard. The default dictionary is a dictionary in which all bytes are set to 0. The operator dictionary is a dictionary customized by an operator. The operator dictionary may be stored in a memory of the UE in advance.

In some other embodiments, the dictionary length may be 2K bytes, 4K bytes, 8K bytes, or the like.

Figure 4:
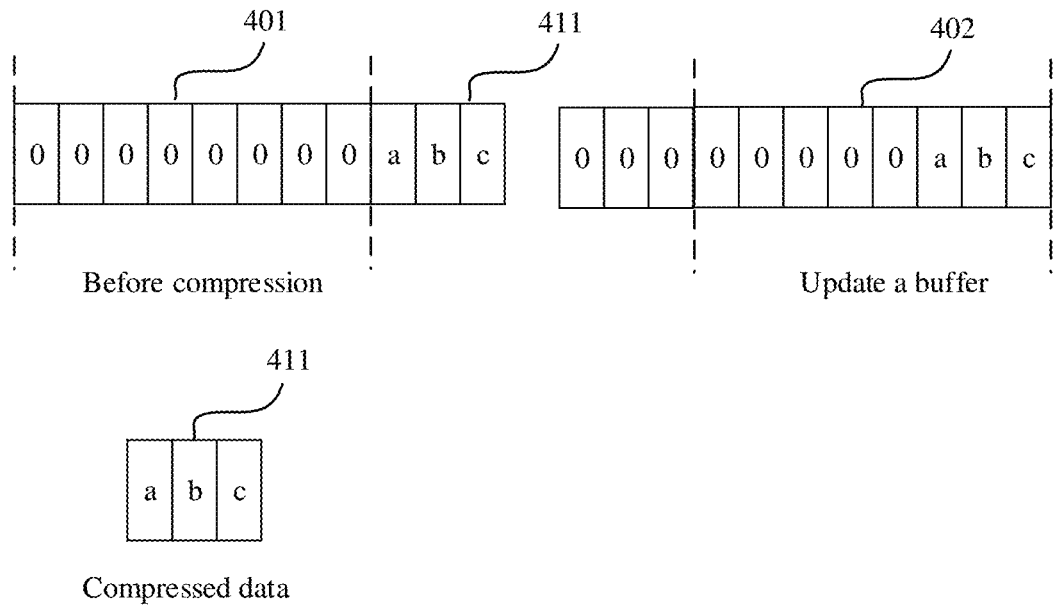
FIG. 4 is a schematic diagram of another UDC technology according to an embodiment of this application.

The UE may determine an initial dictionary after receiving the UDC parameter, and then start to use UDC to compress a data packet based on the initial dictionary. For example, as shown in FIG. 4, a dictionary type configured by the base station is a default dictionary, and a dictionary length is 8 bytes. In this case, the UE may determine a buffer 401, where a size of the buffer 401 is 8 bytes and all the bytes are set to 0. It is assumed that after determining the buffer 401, the UE needs to send a data packet 411, where content of the data packet 411 is "abc". Because the buffer 401 has no content that is duplicate with the data packet 411, the UE transmits the complete data packet 411 to the base station and updates the buffer 401 to form a new buffer 402. After receiving the data packet 411, the base station also updates a buffer to keep consistency with content of the buffer maintained by the UE.

An existing UDC running mechanism has several disadvantages. First, a base station supports at most two DRBs for which UDC is simultaneously activated. However, currently, users tend to use a plurality of applications at the same time. For example, a user may use WeChat, iQIYI, and Google Chrome at the same time. In the conventional technology, UE cannot actively report, to the base station, a quantity of DRBs for which UDC is supported, and the base station considers by default that UDC is supported for at most two DRBs at the same time. In other words, at most two applications can simultaneously enjoy benefits of a low latency and a high rate that are brought by a UDC technology, while another application may be affected by a low rate. This severely affects user experience. However, currently, both UE and a base station can simultaneously support more than two DRBs for which UDC is activated. For example, eight DRBs may be simultaneously established between the UE and the base station. Therefore, it is not necessary to limit a quantity of DRBs for which UDC is simultaneously activated to 2. To resolve this problem, the existing UDC running mechanism needs to be changed, so that UDC can be activated for more DRBs.

Second, the base station cannot determine, based on a type of a data service carried by a DRB, specific DRBs for which UDC can be preferentially activated. In the conventional technology, the base station determines a quantity of DRBs to be established, and each DRB is identified with a quality of service class identifier (quality of service class identifier, QCI) to identify communication quality. QCI categories may range from 1 to 9. The QCI is a parameter used to identify a transmission characteristic of a service data packet in a system. Different bearer services correspond to different QCI values. Different QCI levels correspond to different resource types, priorities, latencies, and packet loss rates. To ensure that an application service can run normally, a matched QCI value needs to be configured for the service. In other words, a matched QCI value needs to be configured for a DRB carrying a data service. For example, a QCI 1 or 2 corresponds to a real-time voice call or a video call. A QCI 5 corresponds to transmission of international mobile subscriber identity (international mobile subscriber identity, IMSI) signaling.

As described above, each DRB link usually corresponds to one specific data service. However, it is difficult for the base station to learn of the data service corresponding to each DRB, and the base station cannot determine, based on types of data services, specific DRBs for which UDC needs to be activated. As a result, some data services that are important to a user cannot enjoy benefits of a low latency and a high rate. For example, it is assumed that the base station determines, based on a QCI, a DRB for which UDC is to be activated. In this case, there is a DRB 1, a DRB 2, a DRB 3, and a DRB 4, where QCI levels of the DRB 1 and the DRB 2 are 1, and QCI levels of the DRB 3 and the DRB 4 are 2. When a maximum quantity of DRBs for which UDC is to be simultaneously activated is 2, the base station may determine that UDC is to be activated for the DRB 1 and the DRB 2 whose QCI levels are 1. However, data services carried by the DRB 1 and the DRB 2 may be text data services and have low requirements on a latency. A data service carried by the DRB 3 is a video or live TV service which has a high requirement on a latency. In this case, the DRB 3 that has a high requirement on a latency cannot enjoy benefits of a low latency, affecting user experience. For another example, an application corresponding to a data service carried by the DRB 3 runs in the foreground, and applications corresponding to data services carried by the DRB 1 and the DRB 2 run in the background. For a user, the application running in the foreground is more important, but cannot enjoy benefits of UDC.

Third, the base station cannot configure an appropriate dictionary length and dictionary type based on a type of data carried by a DRB. In the conventional technology, a dictionary length and a dictionary type cannot be autonomously selected by the UE, but can only be determined by the base station and then delivered to the UE. However, the base station cannot obtain in advance data that the UE wants to upload, and a case in which the dictionary length determined by the base station is inappropriate may occur. Storage resources of the UE and the base station are wasted if the dictionary length is too large. Compression efficiency may be affected if the dictionary length is too small. In addition, when a same dictionary is applied to different data services, the different data services have different compression efficiency. For example, when a default dictionary is used, compression efficiency of a mobile game data service is much lower than that of a web page data service at first. The reason is that a dictionary used for the mobile game data service may not be a dictionary with the highest compression efficiency. Because the UE can accurately learn of to-be-transmitted data and a current service type, the UE may select a dictionary length and a dictionary type.

Currently, UDC is not specified in an NR system. If UDC needs to be applied in the NR system, a solution that can be easily figured out is to directly use a UDC running mechanism in an existing LTE system in the NR system. It is clear that, if the UDC running mechanism in the LTE system continues to be used in the NR system, a disadvantage in the existing UDC running mechanism continues to exist in the NR system. In addition, because data services in the NR system are diversified and terminal device capabilities are enhanced, UDC needs to be simultaneously supported for more DRBs. Therefore, the disadvantage of the UDC running mechanism in the existing LTE system is more prominent in the NR system.

In view of this, the technical solutions in the embodiments of this application are provided. In the embodiments of this application, a terminal device may actively report a maximum quantity of DRBs for which UDC is supported, and then determine some parameters related to UDC, such as a dictionary length and a dictionary type. After determining the parameters, the terminal device may send the parameters to a base station. The solutions in the embodiments of this application can resolve the disadvantage of the existing UDC running mechanism, for example, a quantity of DRBs for which UDC is simultaneously activated is too small, a DRB that carries an important data service cannot use UDC, and an optimal dictionary or an optimal dictionary length cannot be selected. In the embodiments of this application, the terminal device may work in an LTE system, an NR system, or an NSA system. This is not limited in the embodiments of this application. It may be understood that all terminal devices in the embodiments of this application support UDC.

The following describes the technical solutions provided in the embodiments of this application with reference to the accompanying drawings.

Figure 5A:
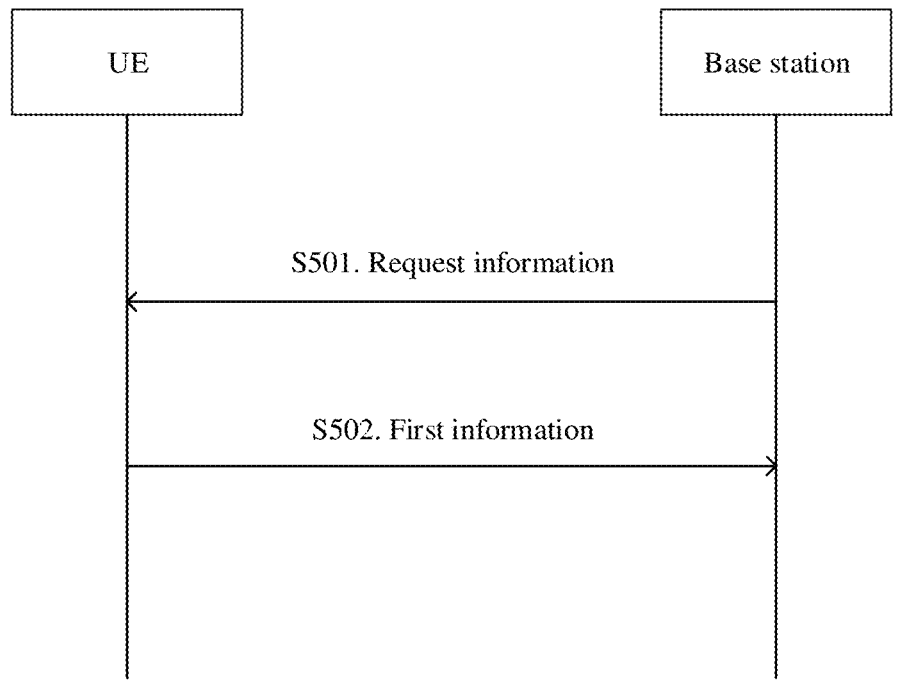
FIG. 5A is another flowchart of reporting a UDC capability according to an embodiment of this application.

FIG. 5A shows an embodiment in which UE reports a UDC capability according to this application.

S501. Transmit request information.

This step is an optional step. In some embodiments, in a network access process, a base station sends the request information to the UE to request the UE to report the UDC capability. The request information may be a capability query request, or may be separate request information. This is not limited in the embodiments of this application.

In some embodiments, a base station sends a UE capability query request to the UE to request capability information of the UE. The UE capability query request includes a UDC capability query request for the UE. In other words, the base station may request, by using the UE capability query request, the UD to report whether the UE has the UDC capability.

In some other embodiments, a base station may alternatively request, by using other signaling or request information, the UE to report the UDC capability of the UE.

S502. Transmit first information.

The UE may actively send the first information to the base station, or may send the first information after receiving the request information from the base station. This is not limited in the embodiments of this application.

The first information is used to indicate whether the UE supports the UDC capability and indicate a maximum quantity of DRBs for which UDC is simultaneously supported. In some embodiments, the first information may alternatively be UDC capability information. The UDC capability information includes information about whether the UE supports the UDC capability and/or a maximum quantity of DRBs that are supported by the UE and for which UDC is simultaneously activated. In some other embodiments, the first information may alternatively indicate only whether the UE supports the UDC capability or a maximum quantity of DRBs for which UDC is simultaneously supported.

In the conventional technology, the UE can report only a message about whether the UE supports the UDC capability. For example, when the UE capability information is reported, one bit may be used to indicate whether the UE supports the UDC capability. In the embodiments of this application, in addition to reporting whether the UE supports the UDC capability, the UE may further report a maximum quantity of DRBs for which the UDC capability is simultaneously supported. In the embodiments, the first information may be sent through an existing message, or may be sent separately.

In some embodiments, when the base station sends the UE capability query request to the UE, the UE may send the first information through the UE capability information. In other words, the first information may be included in the UE capability information. Specifically, in some embodiments, a UDC capability indication field may be extended from 1 bit to 2 bits or more than 2 bits. One bit is used to indicate whether the UE supports the UDC capability, and the rest bits are used to indicate the maximum quantity of DRBs for which the UE simultaneously supports the UDC capability. In some other embodiments, another field of the UE capability information may be reused, to indicate the maximum quantity of DRBs for which the UE simultaneously supports the UDC capability. In some other embodiments, when the UE does not support the UDC capability, only one bit may be used to indicate that the UE does not support the UDC capability, to avoid wasting additional bits. In some other embodiments, the UE may send information about whether the UE supports the UDC capability and the maximum quantity of DRBs for which the UE simultaneously supports the UDC capability, or may send only information about whether the UE supports the UDC capability. The base station may notify the UE in advance of specific information to be sent, or the UE may independently determine specific information to be sent. A manner of indicating the maximum quantity of DRBs for which the UE simultaneously supports the UDC capability is not limited in the embodiments of this application.

In some other embodiments, the UE may separately send the first information. A manner of sending the first information is not limited in the embodiments of this application.

For example, explanation of the first information may be shown in Table 1.

TABLE 1

| Supported UDC-r15 (supportedUDC-r15) | |
| --- | --- |
| Supported standard dictionary (supportedStandardDic-r15) | Support information (Supported(o)) |
| Maximum quantity of supported DRBs (supportedMaxDrbNum) | Quantity information (X(x)) |

In Table 1, Supported(0) indicates that the UDC capability is supported. Supported(1) may be used to indicate that the UDC capability is not supported. The maximum quantity of supported DRBs may be indicated by X(x), where (x) is specific data, and X is the meaning of the data. For example, (x) may be (001), and X may be 5. In this case, 001 is specific data, and 001 indicates that the maximum quantity of DRBs for which the UE simultaneously supports UDC is 5.

After receiving the first information, the base station may determine whether the UE supports the UDC capability and/or determine the maximum quantity of DRBs that are simultaneously supported and for which UDC is activated.

In some other embodiments, the UE may send the first information to the base station, to indicate whether the UE supports the UDC capability. Then, the UE sends second information to the base station, to indicate the maximum quantity of DRBs that are simultaneously supported and for which UDC is activated. A manner of reporting the UDC capability is not limited in the embodiments of this application.

Figure 5B:
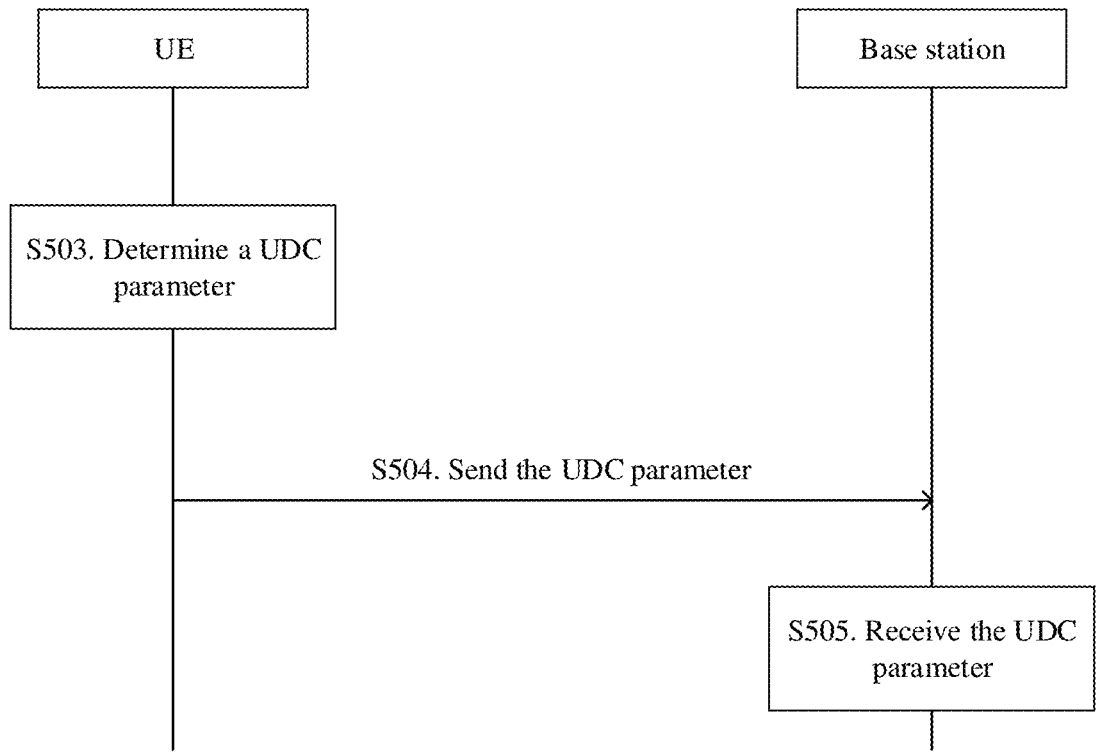
FIG. 5B is a flowchart of a UDC parameter determining method according to an embodiment of this application.

FIG. 5B shows an embodiment of this application.

S503. Determine a UDC parameter.

The UE selects an optimal UDC parameter based on a condition of the UE, for example, a type of a DRB data service and a size of to-be-transmitted data. The UDC parameter may include one or more of a priority of using UDC for a DRB, a dictionary type, a dictionary length, a buffer size, a compression algorithm, and an initial dictionary. For ease of description, in the embodiments of this application, the priority of using UDC for the DRB may also be referred to as a priority of the DRB, and refers to a priority order of using UDC for the DRB.

Figure 6:
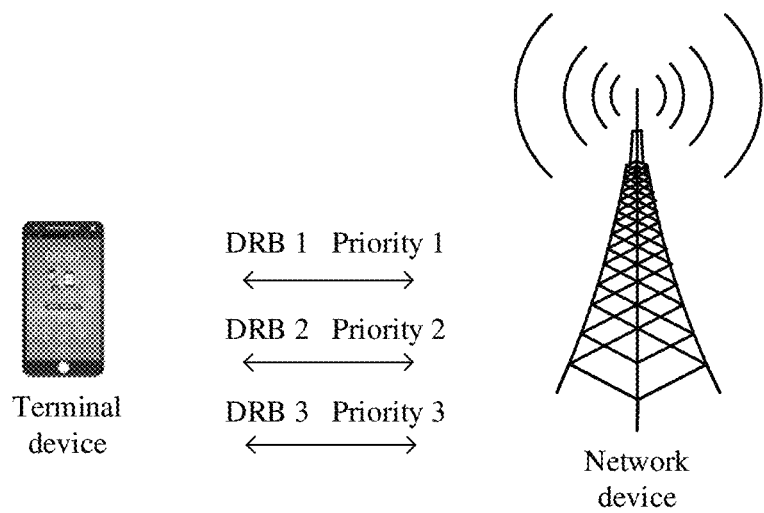
FIG. 6 is a flowchart of a UDC priority determining method according to an embodiment of this application.

If the UDC parameter includes the DRB priority, UDC is preferentially used for a DRB with a higher priority when UDC is simultaneously used for a limited quantity of DRBs. For example, as shown in FIG. 6, the UE and the base station need to establish a DRB 1, a DRB 2, and a DRB 3. A priority of the DRB 1 is 1, a priority of the DRB 2 is 2, and a priority of the DRB 1 is 3. A smaller priority number indicates a higher priority. Therefore, the priority of the DRB 1 is higher than that of the DRB 2, and the priority of the DRB 2 is higher than that of the DRB 3. UDC is used for the DRB 1 and the DRB 2 if the UE and the base station can simultaneously support only two DRBs for which UDC is used. UDC is used for the DRB 1 if the UE and the base station can simultaneously support only one DRB for which UDC is used. If a new DRB is established, specific DRBs for which UDC is to be activated are determined based on a priority of the new DRB. For example, if a DRB 4 is newly established by the UE and the base station and the UE determines that the DRB 4 has the highest priority, UDC is activated for the DRB 1 and the DRB 4, and UDC is deactivated for the DRB 2.

In some embodiments, the UE may determine priorities for all current DRBs at the same time. In some other embodiments, the UE may determine a priority each time a DRB is established. For example, if the UE has determined priorities of two current DRBs, when the UE needs to establish a third DRB, the UE may re-determine priorities based on conditions of the three DRBs.

There may be a plurality of manners of indicating a priority. In some embodiments, the UE may number each DRB from 1. The number 1 indicates the highest priority, the number 2 indicates the second highest priority, and so on. A larger number indicates a lower priority. For example, as shown in FIG. 6, the DRB 1 has the highest priority and may be numbered 1. The priority of the DRB 2 is lower than that of the DRB 1 and higher than that of the DRB 3. Therefore, the DRB 2 may be numbered 2. The DRB 3 has the lowest priority and may be numbered 3.

In some other embodiments, the UE may set three priority levels: low, medium, and high. The UE classifies all DRBs into three types: low, medium, and high. UDC is preferentially used for a DRB with a higher priority. If two or more DRBs are classified into a same type, a sequence may be re-determined based on an establishment sequence or types of carried data services. A manner of indicating a priority is not limited in the embodiments of this application.

There may also be a plurality of manners of determining a priority. In some embodiments, the UE may determine a priority of a DRB based on a type of a data service carried by the DRB. For example, a user may use the UE to watch a video on YouTube and use WeChat to chat with other people by using texts at the same time. Video services have high requirements on a rate and a latency, while text services have low requirements on a latency. Therefore, a priority of a DRB carrying a YouTube video service is higher than a priority of a DRB carrying a WeChat text service. In some other embodiments, the UE may determine whether an application corresponding to a data service carried by a DRB runs in the foreground, and accordingly determine a priority of the DRB. For example, if an application corresponding to a data service carried by the DRB 1 runs in the foreground and an application corresponding to a data service carried by the DRB 2 run in the background, a priority of the DRB 1 is higher than a priority of the DRB 2. In some other embodiments, a priority may alternatively be comprehensively determined based on a type of a data service and a foreground running status. For example, a user watches a YouTube video in the foreground of a mobile terminal, and the mobile terminal runs iQIYI in the background at the same time. Although both YouTube and iQIYI are video data services, because YouTube runs in the foreground and iQIYI runs in the background, a priority of YouTube is higher than that of iQIYI. When UDC is activated for a limited quantity of DRBs, it is preferentially ensured that UDC is activated for a DRB that carries the YouTube data service. It should be noted that a manner of determining a priority is not limited in the embodiments of this application. When UDC is activated for a limited quantity of DRBs, determining a priority can ensure that an important application enjoys a beneficial effect brought by UDC.

If the UDC parameter includes the dictionary type and the dictionary length, in some embodiments, the UE may determine a unified dictionary and a unified dictionary length for all DRBs for which UDC is used. In some other embodiments, the UE may alternatively separately determine, based on a specific condition of a DRB, a dictionary type and a dictionary length for each DRB for which UDC is used. For example, if there is currently a DRB 1 and a DRB 2, the UE may determine that a dictionary type applicable to the DRB 1 is a default dictionary and a dictionary length applicable to the DRB 1 is 2K, and determine that a dictionary type applicable to the DRB 2 is an operator dictionary and a dictionary length applicable to the DRB 2 is 4K.

In some embodiments, the UE may select an appropriate dictionary length for each DRB. The dictionary length may be 2K bytes, 4K bytes, or 8K bytes, or may be a dictionary length defined by the UE or the base station. Different data services have respective appropriate dictionary lengths for compression. Because it is difficult for the base station to learn of a specific data service, it is difficult for the base station to configure an appropriate dictionary length for a DRB. An advantage of the embodiments of this application is that the UE may select an appropriate dictionary length based on a data service carried by a DRB, so that compression efficiency is improved.

In some other embodiments, the UE may select an appropriate buffer size for each DRB. In this way, compression efficiency of a data service carried by the DRB can be improved.

In some other embodiments, the UE may further select an appropriate compression algorithm for each DRB, and the compression algorithm may be preset or may be generated by the UE or obtained from a server.

In some other embodiments, the UE may further select an initial dictionary for each DRB. Different data services have different appropriate initial dictionaries. An appropriate initial dictionary can improve initial compression efficiency of a data service.

In some embodiments, before the UE determines the UDC parameter, the base station may send a message to the UE, to notify the UE of specific UDC parameters that need to be determined. In some other embodiments, the UE may independently determine specific UDC parameters that need to be determined.

S504. Send the UDC parameter.

After determining the UDC parameter corresponding to the DRB, the terminal device may send the UDC parameter to the network device.

Specifically, in some embodiments, the UDC parameter may be put into a protocol data unit (protocol data unit, PDU), and then an identifier is added to the PDU. The identifier may be used to indicate that the PDU includes the UDC parameter. Specifically, a control PDU (control PDU) may be used for uploading. In some other embodiments, the UE may place the UDC parameter into a control element (control element, CE) at a media access control (media access control, MAC) layer, that is, a MAC CE. Then, the UE adds an identifier to the MAC CE, to identify that the MAC CE includes the UDC parameter. A manner of carrying the UDC parameter and a manner of sending the UDC parameter are not limited in the embodiments of this application.

S505. Receive the UDC parameter.

The base station may receive the UDC parameter after the UE sends the UDC parameter to the base station. In some embodiments, the UE sends the UDC parameter by using the PDU. After receiving the PDU with the identifier, the base station may obtain the UDC parameter from the PDU. In some other embodiments, the UE sends the UDC parameter by using the MAC CE. After receiving the MAC CE with the identifier, the base station may obtain the UDC parameter from the MAC CE.

Figure 7A:
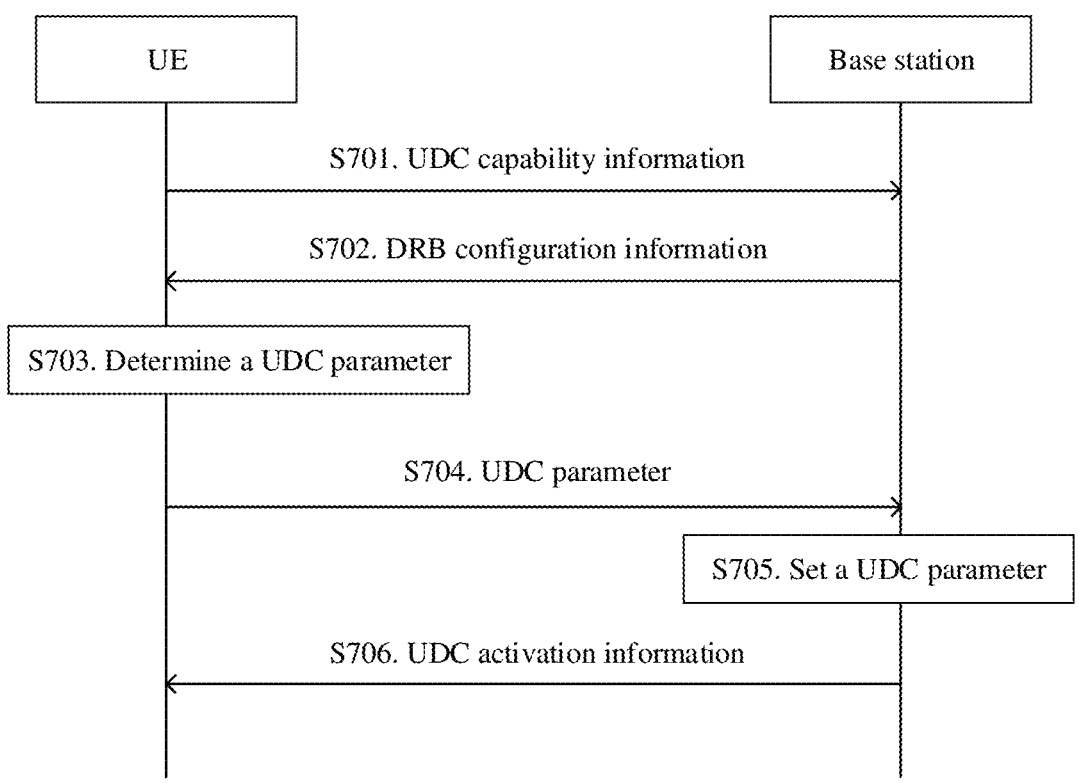
FIG. 7A is a flowchart of a UDC communication method according to an embodiment of this application.

FIG. 7A is a flowchart of an embodiment of this application. A process in the flowchart is run in an NR system, and specific steps are as follows.

S701. Transmit UDC capability information.

UE sends the UDC capability information to a base station, where the UDC capability information includes at least a maximum quantity of DRBs that are supported by the UE and for which UDC is simultaneously performed. In the embodiments of this application, the UE may actively send the UDC capability information to the base station. After receiving the UDC capability information, the base station can learn of the maximum quantity of DRBs that are supported by the UE and for which UDC is simultaneously performed.

In some embodiments, the UE may send the UDC capability information when sending capability information of the UE to the base station. The capability information of the UE may also be referred to as a UE access capability (access capability). The capability information of the UE includes, for example, a packet data convergence protocol (packet data convergence protocol, PDCP) parameter, a physical layer parameter, a radio frequency parameter, and a measurement parameter. A radio frequency capability may include a band combination (band combination) supported by the terminal device and a modulation scheme, a multiple-input multiple-output (multiple-input multiple-output, MIMO) capability, a bandwidth, a subcarrier spacing (SCS), and the like that are supported by the terminal device on a carrier of the band combination. The band combination is frequency bands on which the terminal device can simultaneously work and a carrier combination on the frequency bands. Certainly, the foregoing capability parameter or the foregoing capability information is an example capability parameter or example capability information. The capability information of the UE may include one or more of the foregoing capability parameters and one or more pieces of the foregoing capability information. Specific complete capability information is not described in the embodiments of this application. In the embodiments of this application, the capability information of the UE may further include the UDC capability information.

S702. Transmit DRB configuration information.

After receiving the UDC capability information sent by the UE, the base station may configure a DRB based on a DRB establishment request sent by the UE. For example, after the UE sends the UDC capability information, the UE requests the base station to establish three DRBs. After receiving the request sent by the UE, the base station may configure the three DRBs and configure a corresponding QCI for each DRB. The DRB configuration information may include at least one of the following: a packet data convergence protocol (PDCP) configuration, a radio link control (RLC) configuration, a logical channel configuration, a logical channel identifier, and an evolved packet system (EPS) bearer identifier.

The base station sends the DRB configuration information to the UE after configuring the DRB configuration information.

In some embodiments, the base station may send the DRB configuration information through serving cell handover or radio resource control (radio resource control, RRC) signaling.

S703. Determine a UDC parameter.

The UE may determine the UDC parameter based on a DRB condition after receiving the DRB configuration information sent by the base station. The UDC parameter may include one or more of a dictionary type, a dictionary length, or a UDC priority. For example, the base station configures five DRBs, and the UE may configure corresponding UDC parameters for the five DRBs after receiving the DRB configuration information sent by the base station. In some embodiments, the UE may alternatively configure a UDC parameter for only a DRB with a higher priority. For example, the UE supports a maximum of two DRBs for which UDC is simultaneously activated, but the base station configures five DRBs. In this case, the UE may first determine priorities of the five DRBs, and then configure UDC parameters for two DRBs with the highest priority.

In some embodiments, the UE may obtain a data service carried by each DRB, and determine a priority and a dictionary length of each DRB based on the data service carried by the DRB. For a manner of determining the priority and a manner of determining the dictionary length, refer to the descriptions of S503 in FIG. 5B. Details are not described herein again. When the UE and the base station simultaneously support a limited quantity of DRBs for which UDC is used, it can be ensured, based on priorities, that UDC can be activated for an important DRB. For example, if a DRB with a higher priority is established, when the UE and the base station simultaneously support a limited quantity of DRBs for which UDC is used, UDC may be deactivated for a DRB with the lowest priority, to ensure that UDC can be activated for the DRB with the higher priority.

In some other embodiments, after obtaining a data service carried by each DRB, the UE may select a preset dictionary or generate a dictionary based on different data services. In the conventional technology, because the base station cannot learn of a data service carried by a DRB, the base station cannot select an appropriate dictionary for the data service. However, in the embodiments of this application, the UE may select a most appropriate dictionary based on the data service carried by each DRB. The most appropriate dictionary may be a dictionary with highest compression efficiency. In some embodiments, the UE may select an appropriate dictionary from a standard dictionary, a default dictionary, and an operator-customized dictionary based on different data services. In some other embodiments, if a relatively appropriate dictionary does not exist in preset dictionary types, the UE may alternatively generate a dictionary based on a data service or use a dictionary specifically customized for the data service. For example, a preset dictionary does not have high compression efficiency for Arena of Valor. However, Arena of Valor has a large quantity of users. Therefore, a customized dictionary may be separately configured for Arena of Valor. The dictionary may be set in the UE in advance, or may be a dictionary that has the highest compression efficiency and that is generated by the UE based on transmitted data in a process of running Arena of Valor.

In some other embodiments, the UE may alternatively select a unified UDC parameter based on conditions of all DRBs.

S704. Transmit the UDC parameter.

The UE may send the UDC parameter to the base station after determining the UDC parameter. The UDC parameter may include one or more of a dictionary type, a dictionary length, or a UDC priority. The UE may report the UDC parameter through a control PDU or a MAC CE with an identifier.

S705. Set a UDC parameter.

After receiving the UDC parameter, the base station may determine a DRB for which UDC is to be activated, and set a corresponding UDC parameter for the DRB for which UDC is activated. In some embodiments, the base station may configure a corresponding DRB by using the UDC parameter determined by the UE. In some other embodiments, the base station may alternatively independently determine a UDC parameter. In other words, the base station may not use the UDC parameter sent by the UE to the base station.

In some embodiments, after receiving a DRB priority, the base station may determine, based on the DRB priority, a DRB for which UDC is to be activated. For example, there are five DRBs between the base station and the UE, and a maximum of two DRBs for which UDC is simultaneously activated are supported. In this case, the base station may determine that UDC is to be activated for two DRBs with the highest priority. In some other embodiments, if a DRB for which UDC is activated already exists between the base station and the UE, the base station may determine, based on priorities of DRBs, specific DRBs for which UDC is to be activated and specific DRBs for which UDC is to be deactivated. For example, UDC has been activated for a DRB 1 and a DRB 2 between the base station and the UE, and in this case, a DRB 3 needs to be newly established between the base station and the UE. If the DRB 3 has the highest priority and the DRB 2 has the lowest priority, the base station may determine that UDC continues to be activated for the DRB 1, UDC is to be activated for the DRB 3, and UDC is to be deactivated for the DRB 2. Therefore, the base station needs to configure a UDC parameter for the DRB 3, and then indicate the UDC parameter to the UE.

In some other embodiments, the base station may alternatively determine, according to another rule, a DRB for which UDC is to be activated. For example, the base station may determine, based on a QCI level of a DRB or an establishment sequence of DRBs, a DRB for which UDC is to be activated.

Whether the base station uses the UDC parameter sent by the UE is not limited in the embodiments of this application.

S706. Transmit UDC activation information.

The base station may send the UDC activation information to the UE after setting the UDC parameter. In some embodiments, the UDC activation information may be used to indicate, to the UE, specific DRBs for which UDC is activated and/or UDC parameters of the DRBs. The UDC activation information may be RRC signaling.

In some embodiments, if the base station uses the UDC parameter sent by the UE, the base station may indicate, to the UE, only specific DRBs for which UDC is activated.

In some other embodiments, if the base station determines, in step S705, that there is a DRB for which UDC needs to be deactivated, the base station may indicate, to the UE through the UDC activation information or separate RRC signaling, specific DRBs for which UDC needs to be deactivated.

In the embodiments of this application, the UE may report a maximum quantity of DRBs for which UDC is simultaneously supported, so that UDC can be activated for more DRBs. In addition, the UE may configure a UDC parameter for a DRB. An advantage of this manner is that the UE can learn of a condition of a data service carried by the DRB, and then configure the UDC parameter for the DRB in a targeted manner based on a characteristic of the data service, so as to improve compression efficiency.

Figure 7B:
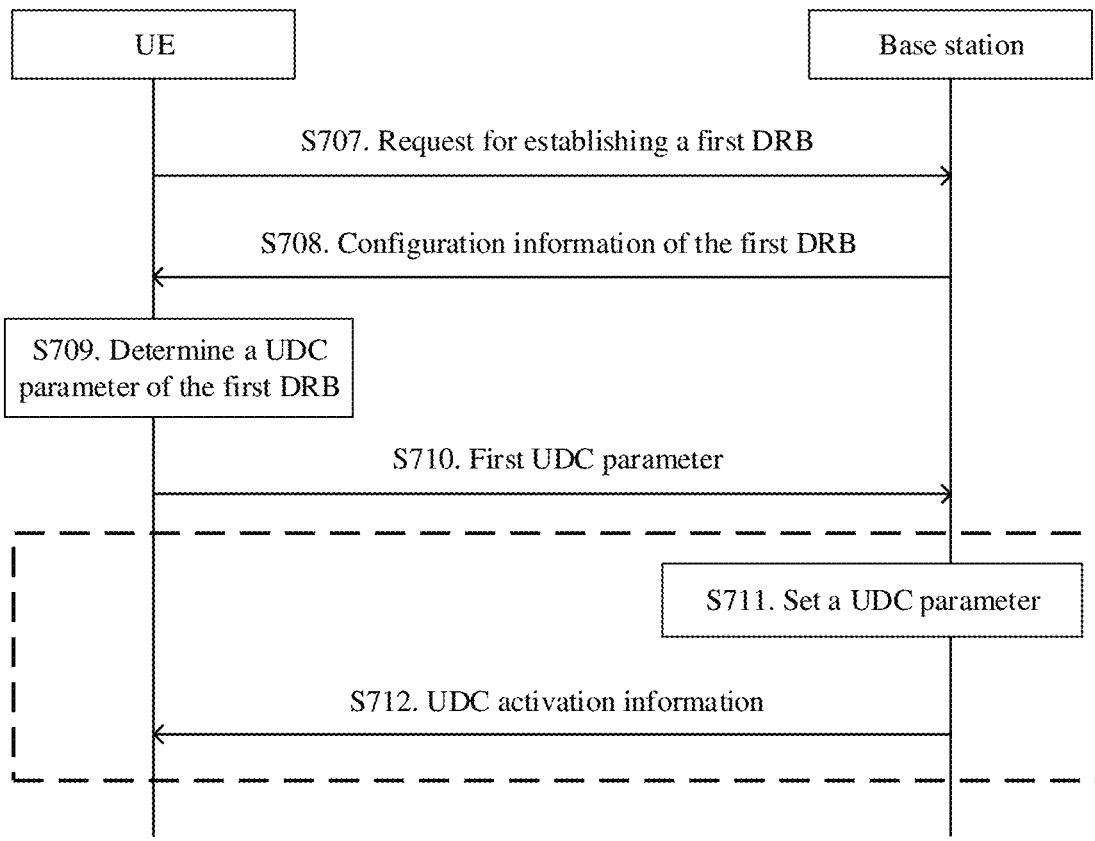
FIG. 7B is a flowchart of another UDC communication method according to an embodiment of this application.

FIG. 7B is another flowchart of an embodiment of this application. In this embodiment of this application, UE has reported UDC capability information, and the UE and a base station have established a DRB.

S707. Transmit a request for establishing a first DRB.

The UE may send a DRB establishment request to the base station when the UE needs to establish a new DRB to carry a new data service. For example, the new DRB may be the first DRB. The first DRB may be one DRB, or may be a plurality of DRBs. This is not limited in the embodiments of this application.

S708. Transmit configuration information of the first DRB.

After receiving the request for establishing the first DRB, the base station may determine the configuration information of the first DRB and send the configuration information of the first DRB to the UE. For a specific sending manner and configuration information content, refer to the descriptions of step S702 shown in FIG. 7A.

S709. Determine a UDC parameter of the first DRB.

After receiving the UDC parameter that is of the first DRB and that is sent by the base station, the UE may determine the UDC parameter of the first DRB based on a data service carried by the first DRB. The UDC parameter of the first DRB may be referred to as a first UDC parameter. In some embodiments, the UDC parameter may include a DRB priority and a dictionary length. In some other embodiments, the UDC parameter may include a type of a dictionary with highest compression efficiency and a dictionary length. It should be noted that the UDC parameter of the first DRB is an ideal UDC parameter determined by the UE. UDC is not necessarily activated for the first DRB, and the ideal UDC parameter determined by the UE is not necessarily used.

For a specific determining step and the UDC parameter, refer to step S703 shown in FIG. 7A. Details are not described herein again.

S710. Transmit the first UDC parameter.

The UE may send the first UDC parameter to the base station after determining the first UDC parameter. For a sending manner, refer to the descriptions of step S704 shown in FIG. 7A. Details are not described herein again.

S711. Set a UDC parameter.

This step is an optional step. After receiving the first UDC parameter, the base station may determine whether UDC is to be activated for the first DRB. The base station may not set a UDC parameter of the first DRB if the UDC parameter is not to be activated for the first DRB.

In some embodiments, if a quantity of DRBs for which UDC is activated is less than a maximum quantity that can be simultaneously supported by the base station and the UE, the base station may determine that UDC is to be activated for the first DRB. In some other embodiments, if a quantity of DRBs for which UDC is activated reaches a maximum quantity that can be simultaneously supported by the base station and the UE, the base station may determine, based on priorities of DRBs, whether UDC needs to be activated for the first DRB.

It should be noted that the base station may alternatively determine, based on another condition such as a CQI level or a DRB establishment sequence, whether UDC needs to be activated for the first DRB. This is not limited in the embodiments of this application.

For a setting process, refer to the descriptions of step S705 shown in FIG. 7A.

S712. Transmit UDC activation information.

This step is an optional step. If the base station determines that UDC does not need to be activated for the first DRB, the base station may not need to set the UDC parameter of the first DRB, and may send the UDC activation information to indicate, to the UE, that UDC is not activated for the first DRB, or may not send the UDC activation information.

In some embodiments, the base station may send the UDC activation information to the UE if the base station determines that UDC needs to be activated for the first DRB. The UDC activation information is used to indicate that UDC needs to be activated for the first DRB and indicate the UDC parameter of the first DRB.

In some other embodiments, the base station determines that UDC needs to be activated for the first DRB, and determines that UDC needs to be deactivated for a second DRB for which UDC has been activated. The base station may indicate, to the UE through one piece of signaling, that UDC is activated for the first DRB and UDC is deactivated for the second DRB. The base station may alternatively indicate, to the UE through one piece of signaling, that UDC is activated for the first DRB, and then indicate, to the UE through another piece of signaling, that UDC is deactivated for the second DRB.

In the embodiments of this application, the UE and the base station may determine, based on priorities of DRBs, whether UDC needs to be activated for a newly established DRB, to ensure that UDC can be activated for an important DRB.

Figure 8:
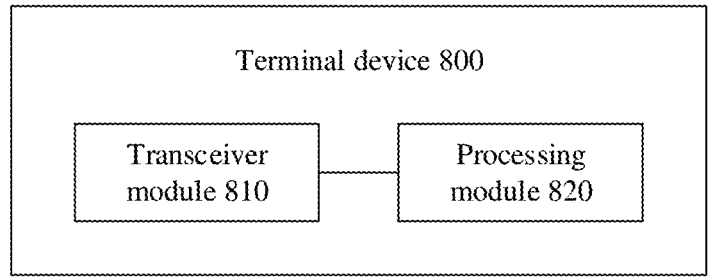
FIG. 8 is a schematic diagram of a terminal device according to an embodiment of this application.

FIG. 8 is a schematic block diagram of a communications device 800 according to an embodiment of this application. For example, the communications device 800 is a terminal device 800. The terminal device 800 includes a processing module 810 and a transceiver module 820. The processing module 810 may be configured to perform all operations except receiving and sending operations performed by the UE in the embodiments shown in FIG. 5A, FIG. 5B, and FIG. 7A, for example, an operation of determining a UDC parameter by the UE, and/or another process used to support the technology described in this specification. The transceiver module 820 may be configured to perform all receiving and sending operations performed by the UE in the embodiments shown in FIG. 5A, FIG. 5B, and FIG. 7A, for example, S701 and S704 in the embodiment shown in FIG. 7A, and/or another process used to support the technology described in this specification.

Figure 9:
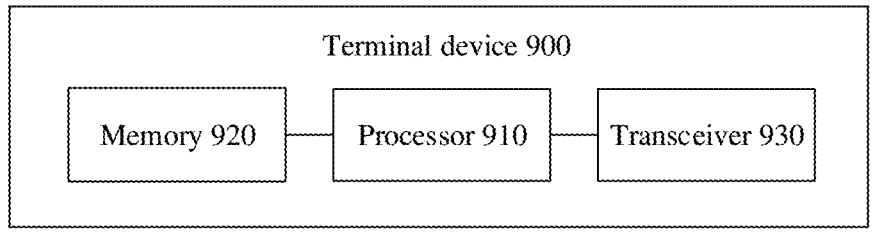
FIG. 9 is a schematic diagram of another terminal device according to an embodiment of this application.

As shown in FIG. 9, an embodiment of this application further provides a communications device 900. For example, the communications device 900 is a terminal device 900. The terminal device 900 includes a processor 910, a memory 920, and a transceiver 930. The memory 920 stores instructions or a program. The processor 910 is configured to execute the instructions or the program stored in the memory 920. When the instructions or the program stored in the memory 920 are/is executed, the processor 910 is configured to perform an operation performed by the processing module 810 in the foregoing embodiment, and the transceiver 930 is configured to perform an operation performed by the transceiver module 820 in the foregoing embodiment.

It should be understood that the terminal device 800 or the terminal device 900 in the embodiments of this application may correspond to the UE in the embodiments shown in FIG. 5A, FIG. 5B, and FIG. 7A. In addition, operations and/or functions of modules in the terminal device 800 or the terminal device 900 are separately used to implement corresponding procedures in the embodiments shown in FIG. 5A, FIG. 5B, and FIG. 7A. For brevity, details are not described herein again.

Figure 10:
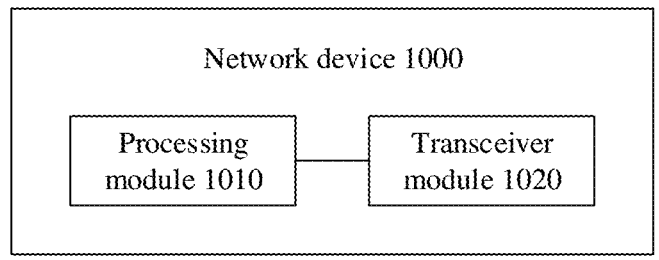
FIG. 10 is a schematic diagram of a network device according to an embodiment of this application.

FIG. 10 is a schematic block diagram of a communications device 1000 according to an embodiment of this application. For example, the communications device 1100 is a network device 1000. The network device 1000 includes a processing module 1010 and a transceiver module 1020. The processing module 1010 may be configured to perform all operations except receiving and sending operations performed by the base station in the embodiments shown in FIG. 5A, FIG. 5B, and FIG. 7A, for example, setting a UDC parameter. The transceiver module 1020 may be configured to perform all receiving and sending operations performed by the base station in the embodiments shown in FIG. 5A, FIG. 5B, and FIG. 7A, for example, S702 and S705 in the embodiment shown in FIG. 7A.

Figure 11:
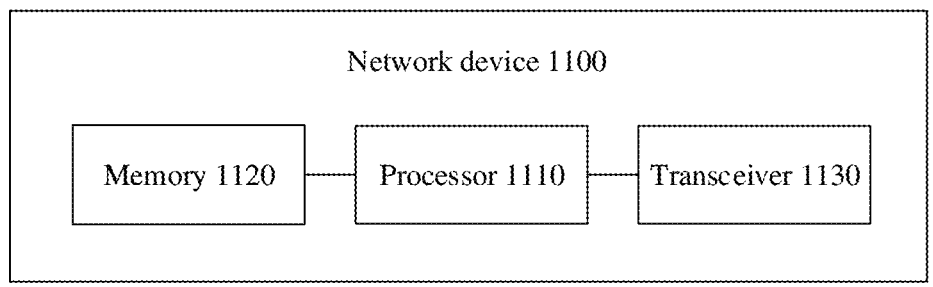
FIG. 11 is a schematic diagram of another network device according to an embodiment of this application.

As shown in FIG. 11, an embodiment of this application further provides a communications device 1100. For example, the communications device 1100 is a network device 1100. The network device 1100 includes a processor 1210, a memory 1120, and a transceiver 1130. The memory 1120 stores instructions or a program. The processor 1110 is configured to execute the instructions or the program stored in the memory 1120. When the instructions or the program stored in the memory 1120 are/is executed, the processor 1110 is configured to perform an operation performed by the processing module 1010 in the foregoing embodiment, and the transceiver 1130 is configured to perform an operation performed by the transceiver module 1020 in the foregoing embodiment.

It should be understood that the network device 1000 or the network device 1100 in the embodiments of this application may correspond to a first network device in the embodiments shown in FIG. 5A, FIG. 5B, and FIG. 7A. In addition, operations and/or functions of modules in the first network device 1100 or the first network device 1200 are separately used to implement corresponding procedures in the embodiments shown in FIG. 5A, FIG. 5B, and FIG. 7A. For brevity, details are not described herein again.

An embodiment of this application further provides a communications apparatus. The communications apparatus may be a terminal device or a circuit. The communications apparatus may be configured to perform actions performed by the terminal device in the method embodiment shown in FIG. 7A or the method embodiment shown in FIG. 8.

Figure 12:
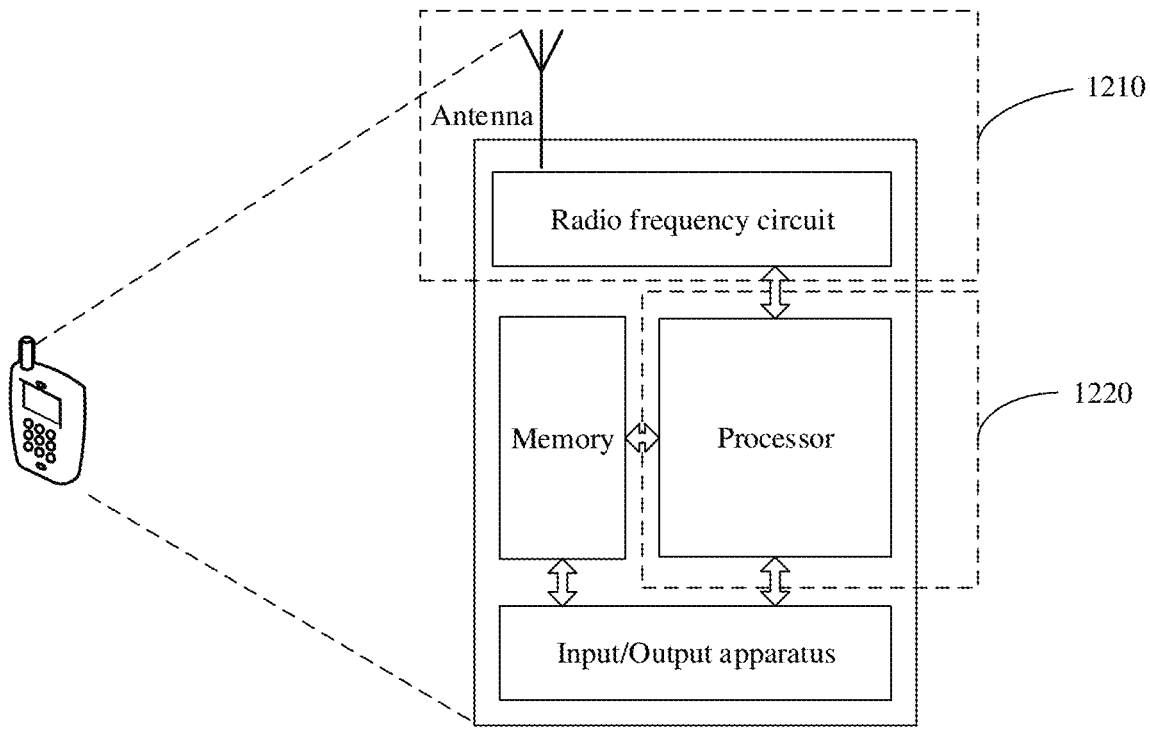
FIG. 12 is a schematic diagram of another terminal device according to an embodiment of this application.

When the communications apparatus is a terminal device, FIG. 12 is a simplified schematic diagram of a structure of the terminal device. For ease of understanding and illustration, an example in which the terminal device is a mobile phone is used in FIG. 12. As shown in FIG. 12, the terminal device includes a processor, a memory, a radio frequency circuit, an antenna, and an input/output apparatus. The processor is mainly configured to: process a communications protocol and communications data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to receive and send radio frequency signals in an electromagnetic wave form. The input/output apparatus, for example, a touchscreen, a display, or a keyboard, is mainly configured to: receive data entered by a user, and output data to the user. It should be noted that some types of terminal devices may have no input/output apparatus.

When needing to send data, after performing baseband processing on the to-be-sent data, the processor outputs a baseband signal to the radio frequency circuit, and the radio frequency circuit performs radio frequency processing on the baseband signal and then sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor, and the processor converts the baseband signal into data, and processes the data. For ease of description, FIG. 12 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in the embodiments of this application.

In the embodiments of this application, the radio frequency circuit and the antenna that have receiving and sending functions may be considered as a transceiver unit of the terminal device, and the processor that has a processing function may be considered as a processing unit of the terminal device. As shown in FIG. 12, the terminal device includes a transceiver unit 1210 and a processing unit 1220. The transceiver unit may also be referred to as a transceiver, a transceiver apparatus, or the like. The processing unit may also be referred to as a processor, a processing board, a processing module, a processing apparatus, or the like. Optionally, a component that is in the transceiver unit 1210 and that is configured to implement a receiving function may be considered as a receiving unit, and a component that is in the transceiver unit 1210 and that is configured to implement a sending function may be considered as a sending unit. In other words, the transceiver unit 1210 includes the receiving unit and the sending unit. The transceiver unit may also be sometimes referred to as a transceiver, a transceiver circuit, or the like. The receiving unit may also be sometimes referred to as a receiver, a receiving circuit, or the like. The sending unit may also be sometimes referred to as a transmitter, a transmitter circuit, or the like.

When the communications apparatus is a chip, the chip includes a transceiver unit and a processing unit. The transceiver unit may be an input/output circuit or a communications interface. The processing unit is a processor, a microprocessor, or an integrated circuit integrated on the chip.

It should be understood that, the processor mentioned in the embodiments of this application may be a central processing unit (central processing unit, CPU), or may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or the processor may be any conventional processor or the like.

It should be further understood that the memory in the embodiments of this application may be a volatile memory or a non-volatile memory, or may include a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. By way of example but not limitative description, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate, a transistor logic device, or a discrete hardware component, the memory (a storage module) is integrated into the processor.

It should be noted that the memory described in this specification is intended to include but is not limited to these memories and any memory of another appropriate type.

It should be understood that sequence numbers of the foregoing processes do not mean execution sequences in the embodiments of this application. The execution sequences of the processes should be determined based on functions and internal logic of the processes, and should not constitute any limitation on implementation processes of the embodiments of this application.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief descriptions, for detailed working processes of the foregoing systems, apparatuses, and units, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electronic, mechanical, or other forms.

The units described as separate components may or may not be physically separate, and components displayed as units may or may not be physical units. To be specific, the components may be located at one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer readable storage medium. Based on such an understanding, the technical solutions of this application essentially, or a part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of the embodiments of this application. Any variation or replacement readily figured out by a person skilled in the art within the technical scope disclosed in the embodiments of this application shall fall within the protection scope of this application. Therefore, the protection scope of the embodiments of this application shall be subject to the protection scope of the claims.

What is claimed is:
1. A method, comprising:
sending, by a terminal device, first information to a network device, wherein the first information indicates that the terminal device supports an uplink data compression (UDC) capability;
receiving, by the terminal device, data radio bearer (DRB) configuration information sent by the network device, wherein the DRB configuration information comprises configuration information of a first DRB;
determining, by the terminal device, a UDC parameter of the first DRB based on the configuration information of the first DRB; and
sending, by the terminal device, the UDC parameter to the network device.

2. The method according to claim 1, wherein:
the first information further indicates a maximum quantity of DRBs that are simultaneously supported by the terminal device and for which UDC is activated; or
the method further comprises:
sending, by the terminal device, second information to the network device, wherein the second information indicates a maximum quantity of DRBs that are simultaneously supported by the terminal device and for which UDC is activated.

3. The method according to claim 1, further comprising:
receiving, by the terminal device, UDC activation information sent by the network device, wherein the UDC activation information indicates a DRB for which UDC is activated.

4. The method according to claim 1, wherein the UDC parameter comprises one or more of or any combination of the following:
a dictionary type;
a dictionary length;
a buffer size;
a compression algorithm;
an initial dictionary; or
a UDC priority.

5. The method according to claim 1, wherein sending, by the terminal device, the first information to the network device comprises:
sending, by the terminal device, the first information to the network device through capability information of the terminal device.

6. The method according to claim 1, wherein determining, by the terminal device, the UDC parameter of the first DRB based on the configuration information of the first DRB comprises:
determining, by the terminal device, a type of a data service carried by the first DRB; and
determining, by the terminal device, the UDC parameter based on the type of the data service, wherein the UDC parameter comprises a dictionary type.

7. The method according to claim 1, wherein the DRB configuration information is received through radio resource control (RRC) signaling.

8. The method according to claim 1, wherein sending, by the terminal device, the UDC parameter to the network device comprises:
assembling, by the terminal device, the UDC parameter into a control protocol data unit (PDU) or a media access control (MAC) control element (CE); and
adding, by the terminal device, an identifier to the control PDU or the MAC CE, wherein the identifier indicates that the control PDU or the MAC CE comprises the UDC parameter.

9. A method, comprising:
receiving, by a network device, first information sent by a terminal device, wherein the first information indicates that the terminal device supports an uplink data compression (UDC) capability;
sending, by the network device, data radio bearer (DRB) configuration information to the terminal device, wherein the DRB configuration information comprises configuration information of a first DRB; and
receiving, by the network device, a UDC parameter sent by the terminal device, wherein the UDC parameter is determined by the terminal device based on the configuration information of the first DRB.

10. The method according to claim 9, wherein:
the first information further indicates a maximum quantity of DRBs that are simultaneously supported by the terminal device and for which UDC is activated; or
the method further comprises:
receiving, by the network device, second information sent by the terminal device, wherein the second information indicates a maximum quantity of DRBs that are simultaneously supported by the terminal device and for which UDC is activated.

11. The method according to claim 9, further comprising:
determining, by the network device, a DRB for which UDC is activated; and
sending, by the network device, UDC activation information to the terminal device, wherein the UDC activation information indicates the DRB for which UDC is activated.

12. The method according to claim 9, wherein the UDC parameter comprises one or more or any combination of the following:
a dictionary type;
a dictionary length;
a buffer size;
a compression algorithm; or
a UDC priority.

13. The method according to claim 9, wherein receiving, by the network device, the first information sent by a terminal device comprises:
receiving, by the network device through capability information of the terminal device, the first information sent by the terminal device.

14. The method according to claim 9, wherein the DRB configuration information is sent through radio resource control (RRC) information.

15. The method according to claim 9, wherein the UDC parameter is determined by the terminal device based on a type of a data service carried by the first DRB, and the UDC parameter comprises a dictionary type.

16. The method according to claim 9, wherein receiving, by the network device, the UDC parameter sent by the terminal device comprises:
receiving, by the network device, a control protocol data unit (PDU) or a media access control (MAC) control element (CE) that carries an identifier, wherein the identifier indicates that the control PDU or the MAC CE comprises the UDC parameter; and
obtaining, by the network device, the UDC parameter from the control PDU or the MAC CE.

17. An apparatus, comprising:
a processor; and
at least one non-transitory computer readable storage medium storing a program that is executable by the processor, the program comprising instructions to:
send first information to a network device, and the first information indicates that the apparatus supports an uplink data compression (UDC) capability;
receive data radio bearer (DRB) configuration information sent by the network device, wherein the DRB configuration information comprises configuration information of a first DRB;
determine a UDC parameter of the first DRB based on the configuration information of the first DRB; and
send the UDC parameter to the network device.

18. The apparatus according to claim 17, wherein:
the first information further indicates a maximum quantity of DRBs that are simultaneously supported by the apparatus and for which UDC is activated; or the program further includes instructions to send second information to the network device, wherein the second information indicates a maximum quantity of DRBs that are simultaneously supported by the apparatus and for which UDC is activated.

19. The apparatus according to claim 17, wherein the program further includes instructions to:
receive UDC activation information sent by the network device, and the UDC activation information indicates a DRB for which UDC is activated.

20. The apparatus according to claim 17, wherein the UDC parameter comprises one or more of or any combination of the following:
a dictionary type;
a dictionary length;
a buffer size;
a compression algorithm;
an initial dictionary; or
a UDC priority.

* * * * *